United States Patent [19]

LaPierre et al.

[11] 4,247,386

[45] Jan. 27, 1981

[54] CONVERSION OF HYDROCARBONS TO OLEFINS

[75] Inventors: Rene B. LaPierre, Moorisville, Pa.; Vern W. Weekman, Cherry Hill, N.J.

[73] Assignee: Mobil Oil Corporation, Fairfax, Va.

[21] Appl. No.: 64,461

[22] Filed: Aug. 6, 1979

[51] Int. Cl.³ .................. C10G 47/18; C10G 69/06
[52] U.S. Cl. ................................. 208/61; 208/111; 585/651; 585/653
[58] Field of Search ............... 208/61, 111; 585/651, 585/752, 653

[56] References Cited

U.S. PATENT DOCUMENTS

| | | | |
|---|---|---|---|
| 3,385,782 | 5/1968 | Buss | 585/752 |
| 3,598,724 | 8/1971 | Mulaskey | 585/752 |
| 3,718,575 | 2/1973 | Watkins | 208/111 |
| 3,944,481 | 3/1976 | Wing et al. | 208/61 |
| 3,972,983 | 8/1976 | Ciric | 423/328 |

Primary Examiner—Herbert Levin
Attorney, Agent, or Firm—Charles A. Huggett; Charles J. Speciale

[57] ABSTRACT

A catalytic process for hydrocracking $C_5^+$ hydrocarbons or mixtures thereof into a $C_2$-$C_5$ mixture paraffin stream in the presence of a palladium/Group IIA, e.g. Be Mg, or IIIB, e.g. Sc, Y, ZSM-20 hydrocracking catalyst, and thermally cracking this mixture to recover ethylene and propylene.

7 Claims, 1 Drawing Figure

GAS OIL HYDROCRACKING SELECTIVITIES 5% Pd Mg ZSM-20
600 PSI, 10000 SCF H₂/BBL, 1LHSV, 425-525°C

GAS OIL HYDROCRACKING SELECTIVITIES  5% Pd Mg ZSM-20
600 PSI, 10000 SCF $H_2$/BBL, ILHSV, 425-525°C

CONVERSION OF HYDROCARBONS TO OLEFINS

BACKGROUND OF THE INVENTION

1. Field of the Invention

This invention relates to catalytic conversion of $C_5+$ hydrocarbon feeds or mixtures thereof (in or out of the presence of sulfur) to a $C_2-C_5$ paraffin stream which is further thermally cracked to light olefins.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of channels. These cavities and channels are uniform in size. Since the dimensions of these pores are such as to accept for absorption molecules of certain demensions while rejecting those of larger dimensions, these materials have come to be known as "molecular sieves" and are utilized in a variety of ways to take advantage of these properties.

Such molecular sieves, both natural and synthetic, include a wide variety of positive ion-containing cyrstalline aluminosilicates. These aluminosilicates can be described as a rigid three-dimensional framework of $SiO_4$ and $AlO_4$ in whch the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No.3,832,449), zeolite ZSM-12 (U.S. Pat. No. 3,832,449), and zeolite ZSM-20 (U.S. Pat. No. 3,972,983) merely to name a few.

A crysalline aluminosilicate zeolite well known in the art is faujasite. The ZSM-20 zeolite for use in the present invention resembles faujasite in certain aspects of structure, but has a notably higher silica/alumina ratio than faujasite.

It is known from U.S. Pat. No. 3,598,724 that $C_3-C_4$ paraffins can be produced from hydrocarbons boiling in the range from 100° F. to 550° F. by hydrocracking over a catalyst comprising mordenite mixed with a nickel/tin catalyst supported on an amorphous inorganic oxide.

Similar patents such as U.S. Pat. No. 3,385,782 suggest the hydrocracking of high boiling hydrocarbon fractions into $C_1-C_4$ paraffins.

These prior art process, as well as U.S. Pat. No. 3,718,575 are primarily concerned with the production of LPG or liquified petroleum gas ($C_3-C_4$) useful as fuels and thus were interested mainly in producing higher yields of $C_3-C_4$ rather than $C_2-C_3$.

SUMMARY OF THE INVENTION

The present invention relates to the use of a hydrogenation function/Group IIA of IIIB-containing synthetic crystalline zeolite ZSM-20 or the thermally treated products thereof for organic compound, e.g. hydrocarbon conversion, in or out of the presence of sulfur. The ZSM-20 composition is described in U.S. Pat. No. 3,972,983 and the catalysts may be prepared by exchanging ZSM-20 with a Group IIA, e.g. Be, Mg, etc., or IIIB, e.g. Sc, Y, etc., metal salt and then incorporating a platinum group metal (e.g. Pd) thereto, as described in co-pending U.S. application Ser. No. 005,066 filed Jan. 22, 1979.

As mentioned in said co-pending U.S. application Ser. No. 005,066, when a hydrogenation component such as palladium is incorporated into the crystalline molecular sieve zeolites ZSM-20 a catalyst is produced which has the ability to (1) hydrogenate aromatic hydrocarbons at low pressure in the presence of sulfur (and nitrogen poisons)
(2) convert sulfur and nitrogen containing poisons to $H_2S$ (and $NH_3$) and saturated hydrocarbons
(3) hydrocrack hydrocarbon mixtures containing sulfur (and nitrogen poisons) to lower molecular weight mixtures while substantially improving the quality of the material remaining in the original boiling range of the hydrocarbon mixture.

It is known that palladium and other Group VIII metals deposited on amorphous supports are unable to hydrogenate aromatic hydrocarbns at low pressure in the presence of sulfur and nitrogen poisons. In addition it is known (A.V. Agafonov et al., Khimiya i Tekhnologiya Topliv i Masel, No. 6 pp. 12–14, June, 1976) that Pd deposited on NaX, NaY, Na mordenite, KNaL, and KNa Erionite are also essentially inactive for the above mentioned conversion. We have also shown that the same applies to Pd/HZSM-12 and Rh/H/Beta. The only Pd zeolites known to use to possess high activity for the above mentioned conversion are Pd Dealuminized Y (s. Agafonov et al., above) and the Pd/ZSM-20 catalyst we have prepared.

It now has been discovered that by using these highly active catalysts, at higher temperatures, it is possible to hydrocrack a crude oil fraction boiling in the range from 200° to 1000° F. with substantially complete conversion into a $C_2-C_5$ product having a normal paraffin to isoparaffin molar ratio ranging from about 3:1 to about 6:1. This stream may then be subsequently thermally cracked into a $C_2-C_3$ olefin mixture.

The advantage in having a high normal paraffin ratio in the $C_2-C_5$ product is that upon subsequent thermal cracking higher ethylene yields are obtained.

A further advantage of the present invention is that whereas it is known to thermally crack gas oil to olefins in yields of 30–35 pounds per 100 pounds of feed, by using the present two-step invention it is possible to obtain yields of 50—60 pounds per 100 pounds of feed.

In general the present invention comprises a process for the production of ethylene and propylene as coproducts which comprises:

A. hydrocracking a crude oil fraction boiling in the range from 200° to 1000° F. by contacting a mixture of said fraction and hydrogen with a highly active sulfided hydrocracking catylyst under pressure greater than about 400 psig wherein:
1. the molar ratio of hydrogen to said fraction is in the range from about 4:1 to about 50:1;
2. the temperature range is from about 300° to about 565° C.; and
3. the residence time is from about one to about 180 seconds;
4. the sulfided catalyst comprises a Group IIA or IIIB exchanged zeolite ZSM-20 into which has been incorporated a platinum group metal;
5. conditions (1)–(3) are selected so as to achieve a normal paraffin to isoparaffin molar ratio greater than about 3:1 in the hydrocracked product;

B. separating the hydrocracked product of step A to recover a $C_2$–$C_5$ alkane product,
C. thermally cracking the $C_2$–$C_5$ product and
D. recovering ethylene and propylene as coproducts.

Preferably, the crude oil fraction used in a gas oil fraction boiling in the range from 350°–800° F. and preferably the molar ratio of hydrogen to the gas oil fraction is in the range from about 10:1 to about 30:1; the temperature range is from about 450° to about 550° C.; and the residence time is from about 5 to about 100 seconds.

DESCRIPTION OF PREFERRED EMBODIMENTS

Figure 1:
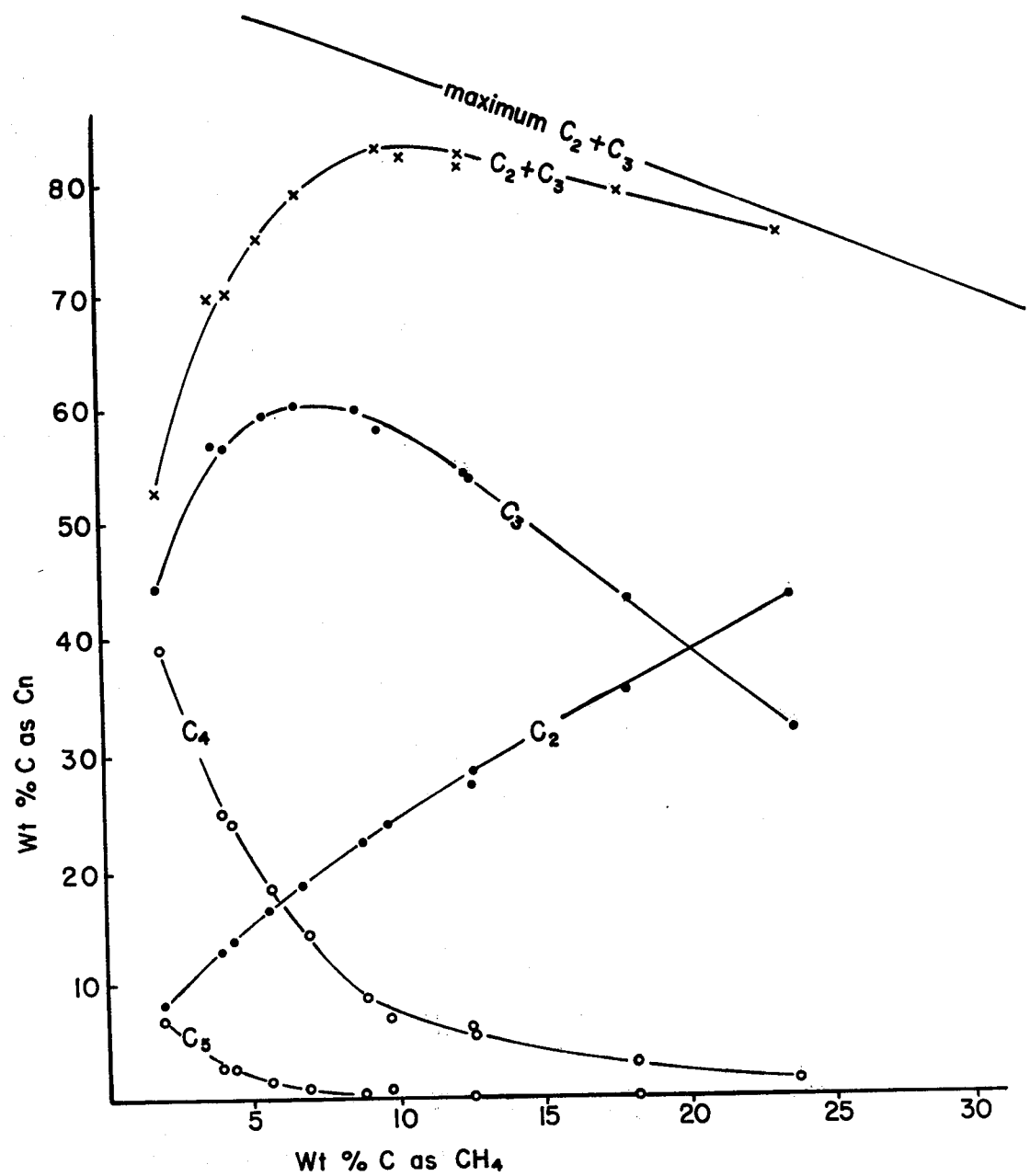

In general, the present invention involves the hydrocracking of hydrocarbon feedstocks boiling in the range from 200° to 1000° F. These include diesel fuel, light gas oil, heavy gas oil, lube oil, catalytic cycle oil, and coke oven oil.

The operating conditions under which the above catalysts are used in this invention for hydrocracking are a temperature range from about 300° to about 565° C. and preferably about 450° to about 550° C., a residence time from 1 to 180 seconds and preferably 5–50 seconds, a range of hydrogen to hydrocarbon molar ratio of from 4:1 to 50:1 and preferably 10:1 to 30:1 and a pressure range from about 400 to 2000 psig and preferably 500–900 psig.

It is to be understood that the conditions selected are chosen in order to insure that the hydrocarbon feed is completely converted to produce $C_2$–$C_5$ alkanes with a yield of 91–95% with only a 2–4% yield of methane and 1–7% yield of $C_8$–$C_9$ alkanes and with a normal paraffin to isoparaffin molar ratio greater than about 3:1.

As is known in the prior art, the catalysts may be sulfided by adding organic or inorganic sulfur compounds to the feed material or the catalyst may be sulfided during their preparation.

A related aspect of the invention as hereinbefore mentioned is that the hydrocracked product can be fed to a thermal cracker operating under a temperature range from about 800° to about 925° C.; a pressure range from about 10 to 30 psig; a resistance time range from about 0.1 to 1.0 seconds and a steam/hydrocarbon ratio of about 0.1 to about 1.0 lb steam/lb. hydrocarbon to produce an ethylene-propylene product.

The ZSM-20 composition can also be identified, in terms of mole ratios of oxides in the anhydrous state, as follows:

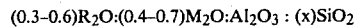

$$(0.3\text{–}0.6)R_2O:(0.4\text{–}0.7)M_2O:Al_2O_3 : (x)SiO_2$$

wherein R is a tetraethylammonium cation, M is an alkalimetal cation and x is at least 7.

In the as synthesized form, the zeolite has a formula, in terms of mole ratios of oxides and in the anhydrous state, as follows:

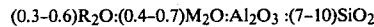

$$(0.3\text{–}0.6)R_2O:(0.4\text{–}0.7)M_2O:Al_2O_3 :(7\text{–}10)SiO_2$$

wherein R is a tetraethylammonium cation and M is an alkali metal cation, especially sodium.

Also, the zeolite ZSM-20 crystal structure is comprised of relatively uniform rigid three-dimensional pore networks characterized by uniform pores of between 7 and 8 Angstrom units in diameter.

The original cations of the as synthesized ZSM-20 can be replaced in accordance with techniques well-known in the art, at least in part, by ion exchange with other cations. Preferred replacing cations have included metal ions, ammonium ions, hydrogen ions and mixtures thereof. Particularly preferred cations have been those which render the zeolite catalytically-active, especially for hydrocarbon conversion. These include hydrogen, hydrogen precursors (e.g. ammonium ions), rare earth metals, aluminum, metals of Groups IB, IIB, IIIB, IVB, VIB, IIA, IIIA, IVA and VIII of the Periodic Table of Elements.

The synthetic ZSM-20 zeolite possesses a definite distinguishing hexagonal crystalline structure whose X-ray diffraction pattern shows substantially the significant lines set forth in Table 1.

TABLE 1

| d(A) | Relative Intensities |
|---|---|
| 14.90 ± 0.3 | VS |
| 14.21 ± 0.3 | VS |
| 8.67 ± 0.02 | M |
| 8.19 ± 0.15 | W |
| 7.44 ± 0.15 | M |
| 5.66 ± 0.10 | S |
| 5.34 ± 0.10 | W |
| 5.17 ± 0.10 | W |
| 5.00 ± 0.10 | W |
| 4.87 ± 0.10 | W |
| 4.74 ± 0.10 | W |
| 4.33 ± 0.09 | M |
| 3.98 ± 0.08 | W |
| 3.83 ± 0.08 | W |
| 3.76 ± 0.08 | M |
| 3.66 ± 0.07 | S |
| 3.60 ± 0.07 | W |
| 3.55 ± 0.07 | W |
| 3.45 ± 0.07 | W |
| 3.33 ± 0.07 | W |
| 3.29 ± 0.07 | M |
| 3.20 ± 0.06 | W |
| 2.90 ± 0.06 | M |
| 2.87 ± 0.06 | W |
| 2.84 ± 0.06 | M |
| 2.79 ± 0.06 | W |
| 2.75 ± 0.06 | W |
| 2.70 ± 0.05 | W |
| 2.61 ± 0.05 | M |
| 2.41 ± 0.05 | W |
| 2.37 ± 0.05 | W |
| 2.17 ± 0.04 | W |
| 2.14 ± 0.04 | W |
| 2.09 ± 0.04 | W |

TABLE 1-continued

| d(A) | Relative Intensities |
|---|---|
| 2.05 ± 0.04 | W |

These values were determined by standard techniques. The radiation was the K-alpha doublet of copper, and a scintillation counter spectrometer with a strip chart pen recorder was used. The peak heights, I, and the position as a function of 2 times theta, where theta is the Bragg angle, were read from the spectrometer chart. From these, the relative intensities, 100 I/Io, where Io is the intensity of the strongest line or peak, and d(obs), the interplanar spacing in Angstroms (A), corresponding to the recorded lines, were calculated. In Table 1, relative intensities are listed according to the following symbol definitions: VS=very strong, S=strong, M=medium and W=weak. It should be understood that this X-ray diffraction pattern is characteristic of all the species of ZSM-20 compositions. Ion exchange of the sodium ion with cations reveals substantially the same pattern with some minor shifts in interplanar spacing and varition in relative intensity. Other minor variations can occur depending on the silicon to aluminum ratio of the particular sample, as well as if it has previously been subjected to thermal treatment.

In order to more fully illustrate the nature of the invention and the manner of practicing same, the following non-limiting examples are presented.

The ZSM-20 starting material and the Pd/Mg/ZSM-20 catalyst were made in accord with procedures set forth in co-pending U.S. application Ser. No. 005,066, Examples 1 and 2, respectively. The catalyst was regenerated at 400° C. for 16 hours in flowing 2.1% $H_2S$ at atmospheric pressure.

FIG. 1 presents selectivity data obtained over the catalyst at 600 PSI, 1 LHSV, 10000 SCF $H_2$/BBL and temperatures from 425°–525° C. Note that in all cases conversion to $C_1$–$C_5$=100% and high selectivities to $C_2$+$C_3$ are obtained.

These data are compared to those presented in Examples 1 and 12 of U.S. Pat. No. 3,944,481 in Tables 1 and 2 respectively. These results show that even at twice the space velocity lower temperatures are required for the 5% PdMg ZSM-20 catalyst and selectivities to $C_2$ and $C_3$ are much higher.

TABLE 1

| | Ex. 1<br>(U.S. 3,944,481)<br>6%Ni 19%W 2%F<br>$SiO_2/Al_2O_3$ | Example 1<br>(Present Invention)<br>5% PdMg ZSM-20 |
|---|---|---|
| LHSV | 0.5 | 1.0 |
| H2CIRC(SCF/BBL) | 16400 | 10000 |
| T(°C.) | 550 | 454 |
| P (PSI) | 600 | 600 |
| $CH_4$ | 4.0 | 4.0 |
| $C_2H_6$ | 5.9 | 12.6 |
| $C_3H_8$ | 35.9 | 56.9 |
| $C_4H_{10}$ | 34.4 | 24.5 |
| $C_5H_{12}$ | 14.5 | 1.9 |
| $C_6$–$C_9$ | 5.3 | — |

TABLE 2

| | Ex. 12(U.S. 3,944,481)<br>6%Ni 19%W 2%F REY | Example 2<br>(Present Invention)<br>5% PdMg ZSM-20 |
|---|---|---|
| LHSV | 0.5 | 1.0 |
| H2CIRC (SCF/BBL) | 16000 | 10000 |
| T(°C.) | 475 | 440 |
| P (PSI) | 600 | 600 |
| $CH_4$ | 3.1 | 3.1 |
| $C_2H_6$ | 7.7 | 10.5 |
| $C_3H_8$ | 40.3 | 51.7 |
| $C_4H_{10}$ | 33.1 | 30.7 |
| $C_5H_{12}$ | 10.0 | 4.0 |
| $C_6$–$C_9$ | 5.8 | — |

What is claimed is:

1. A process for the production of an ethylene-propylene product which comprises:
   A. hydrocracking a crude oil fraction boiling in the range from 200° to 1000° F. by contacting a mixture of said fraction and hydrogen with a highly active sulfided hydrocracking catalyst under a pressure greater than about 400 psig wherein
      1. the molar ratio of hydrogen to said fraction is in the range from about 4:1 to about 50:1;
      2. the temperature range is from about 300° to about 565° C.; and
      3. the residence time is from about one to about 180 seconds;
      4. the catalyst comprises a hydrogenation function/Group IIA or IIIB-containing zeolite ZSM-20;
   B. separating the hydrocracked product of step (A) to recover a $C_2$–$C_5$ alkane product;
   C. thermally cracking the $C_2$–$C_5$ product and
   D. recovering ethylene and propylene as coproducts.

2. The method of claim 1 wherein the crude oil fraction is a gas oil boiling in the range from 350°–800° F.

3. The method of claim 2 wherein
   1. the molar ratio of hydrogen to said fraction is in the range from about 10:1 to about 30:1;
   2. the temperature range is from about 450° to about 550° C.; and
   3. the residence time is from about 5 to about 50 seconds.

4. A process for the production of an ethylene-propylene product which comprises:
   A. hydrocracking a crude oil fraction boiling in the range from 200° to 1000° F. by contacting a mixture of said fraction and hydrogen with a highly active sulfided hydrocracking catalyst under a pressure greater than about 400 psig wherein
      1. the molar ratio of hydrogen to said fraction is in the range from about 4:1 to about 50:1;
      2. the temperature range is from about 300° to about 565° C.; and
      3. the residence time is from about one to about 180 seconds;
      4. the catalyst comprises a hydrogenation function/magnesium-containing zeolite ZSM-20, and wherein said hydrogenation function further comprises a Group VIII metal of the Periodic Table or mixtures thereof;
   B. separating the hydrocracked product of step (A) to recover a $C_2$–$C_5$ alkane product;
   C. thermally cracking the $C_2$–$C_5$ product and D. recovering ethylene and propylene as coproducts.

5. The process of claim 4 wherein said Group VIII metal is palladium.

6. The method of claim 4 or 5 wherein the crude oil fraction is a gas boiling in the range from 350°–800° F.

7. A process for the production of light paraffins which comprises:
A. hydrocracking a crude oil fraction boiling in the range from 200° to 1000° F. by contacting a mixture of said fraction and hydrogen with a highly active sulfided hydrocracking catalyst under a pressure greater than about 400 psig wherein
1. the molar ratio of hydrogen to said fraction is in the range from about 4:1 to about 50:1;
2. the temperature range is from about 300° to about 565° C.; and
3. the residence time is from about one to about 180 seconds;
4. the catalyst comprises a hydrogenation function/Group IIA or IIIB-containing zeolite ZSM-20;
B. separating the hydrocracked product of step (A) to recover a $C_2$–$C_5$ alkane product.

* * * * *

UNITED STATES PATENT AND TRADEMARK OFFICE
CERTIFICATE OF CORRECTION

PATENT NO. : 4,247,386
DATED : January 27, 1981
INVENTOR(S) : Rene B. LaPierre et al.

It is certified that error appears in the above—identified patent and that said Letters Patent is hereby corrected as shown below:

Column 1, line 22 "demensions" should read -- dimensions --.

Column 1, line 31 "whch" should read -- which --.

Column 1, line 58, "crysalline" should read -- crystalline --.

Column 2, line 40, "hydrocarbns" should read -- hydrocarbons --.

Column 5, line 38, after "$H_2S$" insert -- in $H_2$ --.

Column 6, line 28 delete "and"

Signed and Sealed this

Twenty-second Day of September 1981

[SEAL]

Attest:

GERALD J. MOSSINGHOFF

Attesting Officer

Commissioner of Patents and Trademarks